March 22, 1966     C. M. GOBHAI     3,241,758
FLUID LOGIC PULSE FREQUENCY RATE SYSTEM
Filed June 24, 1964     2 Sheets-Sheet 1
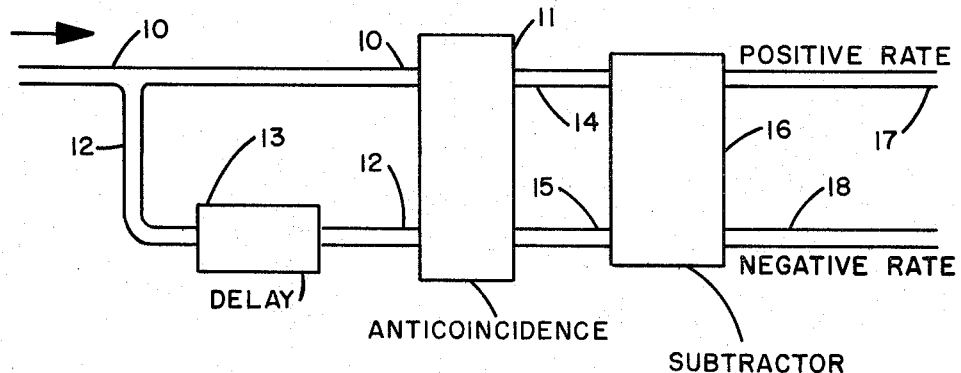
FIGURE I
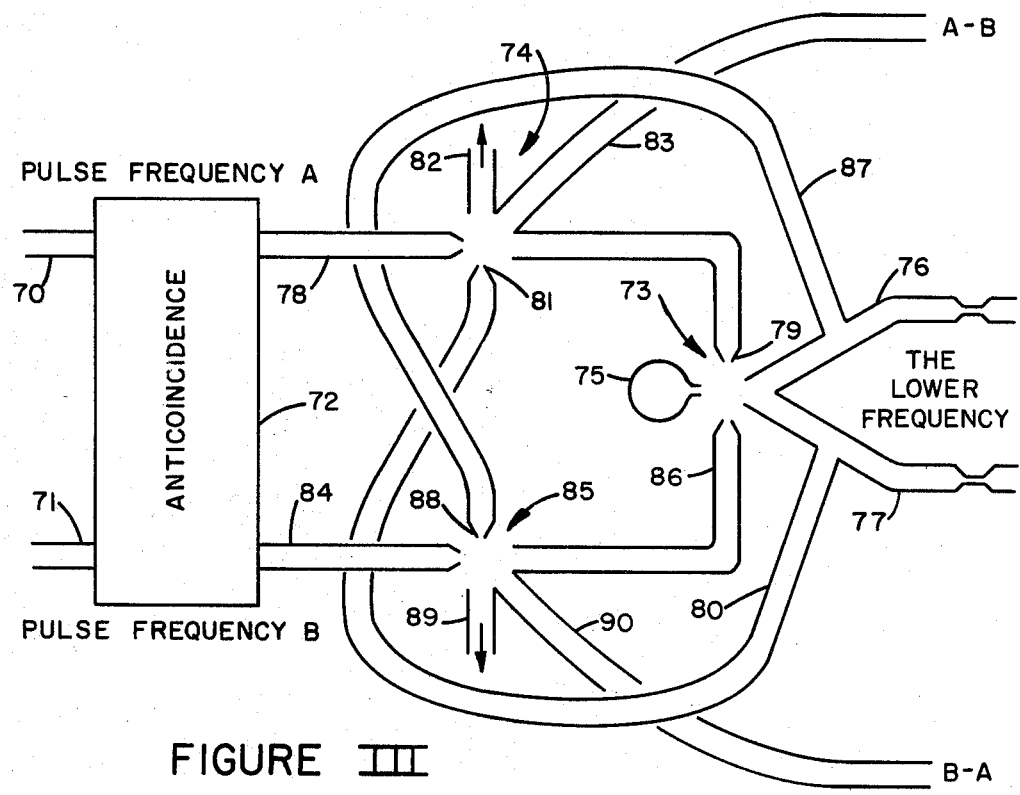
FIGURE III
INVENTOR.
CAVAS M. GOBHAI
BY
AGENT March 22, 1966 C. M. GOBHAI 3,241,758
FLUID LOGIC PULSE FREQUENCY RATE SYSTEM
Filed June 24, 1964 2 Sheets-Sheet 2
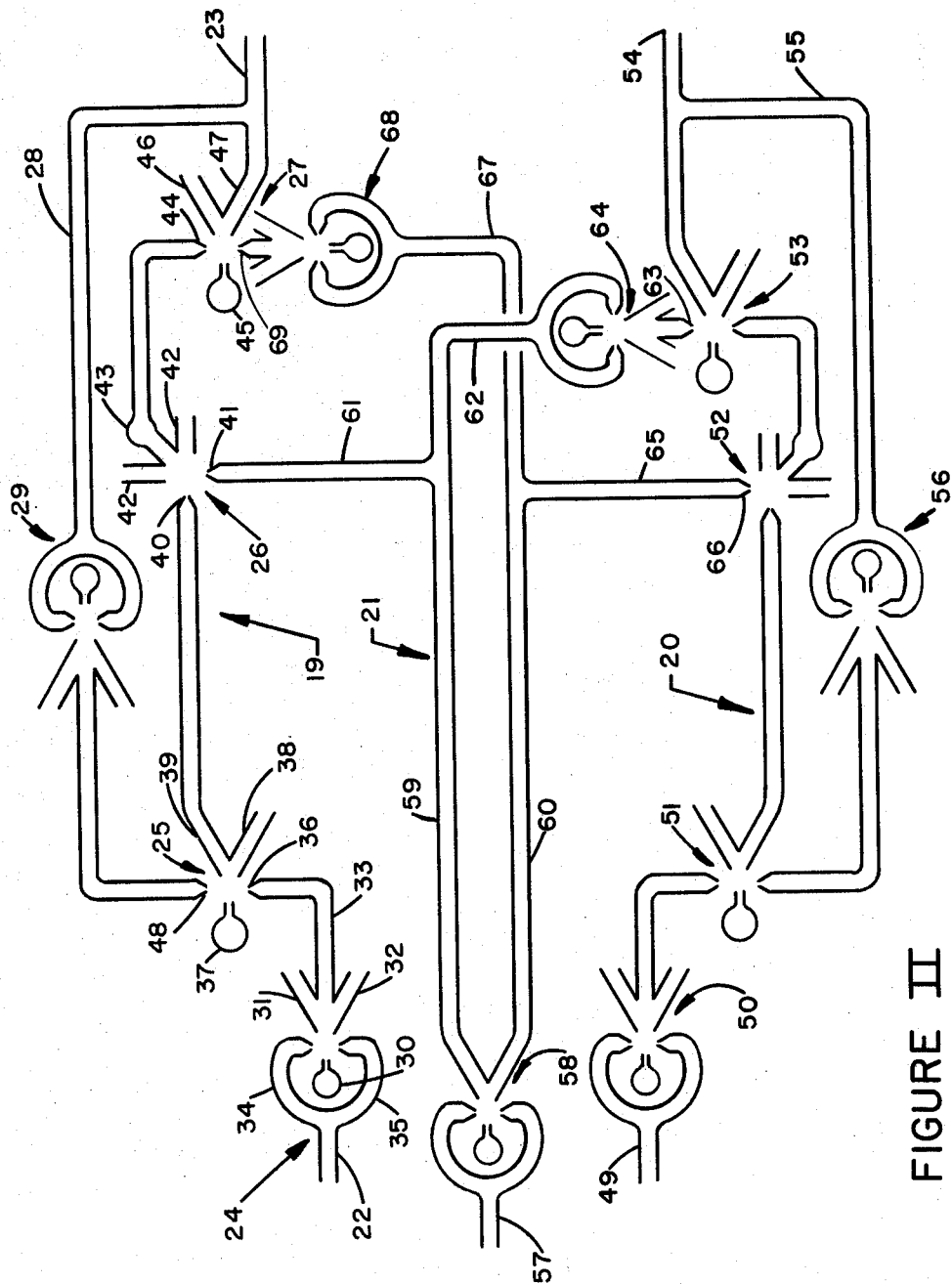
FIGURE II
INVENTOR.
CAVAS M. GOBHAI
BY Lawrence H. Patton
AGENT

United States Patent Office 3,241,758
Patented Mar. 22, 1966

3,241,758
FLUID LOGIC PULSE FREQUENCY RATE SYSTEM
Cavas M. Gobhai, Cambridge, Mass., assignor to The Foxboro Company, Foxboro, Mass., a corporation of Massachusetts
Filed June 24, 1964, Ser. No. 377,704
1 Claim. (Cl. 235—201)

This invention relates to fluid logic devices with the advantage of compactness and no moving parts. It has particular reference to pulse trains and pulse frequency.

This invention particularly provides means for determining rate of change of pulse frequency. This rate is established in one of two output channels depending on whether the rate is increasing or decreasing.

The essential situation of this invention is that, through delay means, the present rate is compared with the rate immediately preceding.

This is a dynamic fluid device on a continuous flow basis.

It is therefore an object of this invention to provide a new and useful fluid logic system.

Other objects and advantages of this invention will be in part apparent and in part pointed out hereinafter and in the accompanying drawings, wherein:

FIGURE I is a schematic illustration of the system according to this invention;

FIGURE II is a schematic illustration of an anti-coincidence system in the combination of this invention; and, FIGURE III is a schematic illustration of a reversible subtractor system as an application in a combination of this invention.

Referring to FIGURE I, there is provided an input passage at 10 for carrying a train of pulses at a frequency the rate of which is to be determined. This input passage 10 is applied as one of the inputs to an anti-coincidence unit 11.

From the input passage 10, there is a branch passage 12 which runs generally parallel with the input passage 10, as a second input to the anti-coincidence unit 11. The passage 12 is provided with suitable delay means at 13, so that there is applied to the anti-coincidence unit 11, two input trains of pulses. One is the present frequency of the pulses as in the passage 10, and the other is in the input 12 after the delay 13, as the frequency of the pulses at a fixed time past, as established by the delay 13.

The anti-coincidence unit provides an output in which none of the pulses in the present train are coincident with the pulses in the delayed train.

The output of the anti-coincidence unit is in two passages, one at 14, and one at 15, respectively the continuations of the input passage 10 and the delay passage 12.

The passages 14 and 15 are means for applying, to a subtractor unit 16, two separate pulse trains, one present and one delayed.

The anti-coincidence system of FIGURE I is shown in and described with respect to FIGURE II.

The pulse subtractor unit 16 is provided with means for subtracting either the pulses in the delayed input 15 from those of the present input 14 or the reverse, depending on which is the greater. The lesser frequency is always automatically subtracted from the greater frequency.

Accordingly, it will be seen in connection with the details of FIGURE III, that the difference in the frequencies thus provides a rate of change of frequency. On the one hand the output of the subtractor 16 provides a positive rate indication in an output passage 17, and a negative rate indication in an output passage 18.

In FIGURE II, the pulse train systems and the time oscillator system are illustrated as operating from left to right. One pulse train is indicated at 19, at the top of the drawing, and the other is indicated generally at 20, at the bottom of the drawing. The timing oscillator system is indicated generally at 21, between the pulse train systems 19 and 20. The pulse train system 19 has an input passage therefor at 22, an output passage at 23. This system 19 consists of a series arrangement of a differentiator 24, a flip-flop unit 25, an "and" gate 26, and a flip-flop 27. From the output 23 there is a feedback passage 28 leading back to the first flip-flop 25, through a differentiator 29.

The input differentiator 24 is provided with a power source at 30. It is generally in the form of a flip-flop unit, with the ordinary flip-flop outputs 31 and 32 used only as vents. Between the outputs 31 and 32 there is a central output 33 through which the pulse train continues into the flip-flop unit 25. The differentiator is operated by means of two curved passages 34 and 35 which are essentially uniform in shape. Both stem from the input passage 22. These passages 34 and 35 act as opposing control inputs for the differentiator 24.

By the nature of the formation of the differentiator or by a lateral starting set signal (not shown) it may be considered that the first pulse of the pulse train in the input 22 might use one or the other of the passages 34 and 35. Assuming it to be the passage 34, this first pulse would operate the differentiator to flip the output from the output vent 31 to the output vent 32. In so doing a pulse would be generated in the common output 33, representative of the controlling pulse which is operating the flip-flop device.

At this stage of the operation of the differentiator 24, by the nature of the fluid logic flip-flop, there will be a relatively high pressure at the control input of the passage 34 and a relatively low pressure at the control input of the passage 35. Because of this difference in pressure, after the first pulse arrives in the differentiator 24, there is a tendency to equalization of pressure back through the passage 34, and then forward through the passage 35. This tendency sets up a small stream in this counter-clockwise direction.

Accordingly, when the second pulse comes along in the input 22, it will encounter this counter-clockwise flow and will follow it so as to apply the second pulse to the control input 35. This action flips the output in passage 32 to the output passage 31, and in passing provides an output pulse in the common central passage 33.

The input frequency is thus duplicated in the output passage 33 of the differentiator 24. The purpose of this action is to provide a sharp pulse input to the flip-flop 25. If the input train is formed of step signals, they will be translated into pulses for the suitable operation of the flip-flop 25.

The pulse train, in the form of sharp pulses, now appears in the passage 33 and is applied to the flip-flop 25 at a control input 36. The flip-flop 25 is provided with a power source 37 and has a vented output 38 and an operating output 39.

The normal inactive situation of the flip-flop 25 is with the output in the vent passage 38. When there is a pulse in the control input 36, the flip-flop 25 has its output moved to the output passage 39 and this output continues, to provide a control input 40 to the "and" gate 26.

The "and" gate 26 has another control input 41, from the timing oscillator system 21. If there is no signal in the timing input 41 then a pulse in the input 40 will pass through the "and" gate and vent by means of passage 42. Similarly, a timing signal in the control input 41 occurring without a pulse in the input 40 will be vented to output 42.

In the event of simultaneous occurrence of signals in the "and" gate 26 both at 40 and 41, the signals will encounter each other within the "and" gate, mutually deflect each other, and exit through the "and" gate output at 43 as a signal representative of one pulse in the pulse train system 19. The signal in the output passage 43 of the "and" gate 26 is applied to the flip-flop unit 27 as a control input at 44. The flip-flop 27 has a power source at 45, a vent output 46, and an operating output 47. The flip-flop unit 27 is normally established with the output venting through passage 46. When a signal appears in the control input 44, the output is flipped over to the operating output passage 47 as an output signal for the pulse train system 19, by way of output passage 23.

Simultaneously with this action a signal is fed back through passage 28, and through differentiator 29, to a control feedback input 48 to the flip-flop 25. This action flips the signal therein back to the output vent passage 38 to reset this device and cut off the output signal of that system.

The differentiator 29 is structurally identical with the differentiator 24 in the input. It operates in the same manner, so that anything in the form of a step signal will be reduced to a pulse. A pulse will simply be transmitted as a duplicated pulse. Thus whatever controlling signals are applied to the flip-flop 25 in the feedback control input 48 are in the form of simple, short, sharp control pulses.

The pulse train system 20, shown at the bottom of the drawing, is a duplication of the system 19 described above and operates identically with respect thereto.

Thus the pulse train system 20 comprises a series arrangement of an input passage 49, a differentiator 50, a flip-flop unit 51, an "and" gate 52, and a final flip-flop 53, leading to an output passage 54. There is also a feedback passage 55 from the output passage 54, through a differentiator 56 to the flip-flop unit 51.

The timing oscillator system 21 comprises an input passage 57 to a timing oscillator. This is identical with and operates in the same way as the differentiator 24 of the pulse train system 19, except that the timing oscillator has no central common output, and both of its ordinary flip-flop outputs are used.

The two outputs of the timing oscillator are at 59 and 60. From the passage 59 there is a side passage 61 leading to the "and" gate 26 of the pulse train system 19, by way of the control input 41. Also from the timing oscillator output 59, there is an output passage 62 leading to the pulse train system 20, specifically the terminal flip-flop unit 53, as a control input 63. The passage 62 includes a differentiator 64 which provides a pulse output like that of the differentiator 24 in system 19, for the purpose of providing suitable operating signals for the flip-flop unit 53.

Similarly, from the timing oscillator output 60 there are lateral passages with one at 65, to the pulse train system 20, as a control input at 66, to the "and" gate 52. There is also a lateral passage at 67, through a differentiator 68, to the terminal flip-flop 27 of the pulse train system 19, by way of an input control passage at 69.

It will be seen that when the timing oscillator provides a step signal in the output 59, it simultaneously activates the pulse train system 19 "and" gate 26, and resets the pulse train system 20 flip-flop 53.

In similar fashion, an output signal in the timing oscillator passage 60, simultaneously activates the pulse train system 20 "and" gate 52, and resets the pulse train system 19 terminal flip-flop 27.

In the operation of this device, the timing oscillator is established so that it operates, for example, first in system 19, and then in system 20, in a regular, scanner-like procedure. It looks first to the system 19, to see if there are any pulses going through, or ready to go through. If so, it lets them through, meanwhile holding back pulses in system 20. The reverse is accomplished by way of a signal in the timing oscillator output 60.

If the timing oscillator is in the actuation stage with respect to the system 19, then an input pulse will proceed through the flip-flop 25 and through the "and" gate 26 because of the simultaneous appearance of signals at 40 and 41. It will then operate the flip-flop 27 to provide the output in the passage 23, and the feedback in the passage 28 to reset the initial flip-flop 25. The result is a single output pulse in passage 23.

While this is going on, if there is a coincident pulse in the pulse train system 20 it will reach the "and" gate 52, but will not pass through, except to vent, because there will be no signal in the input passage 66.

When the timing oscillator reverses, and actuates the system 20, the signal which is waiting at the gate 42 will be allowed to pass through. Similar holding action is effective with respect to the gate 26 and the pulse train system 19, when a signal arrives there during the time when the timing oscillator is activating the system 20.

Thus in case of a pulse in one system coincident with a pulse in the other system, according to the timing of the oscillator 58, one of these pulses will be held back long enough for the other to go through.

It is preferable in this situation that the frequency of the timing oscillator be such that one cycle comprises a positive operation of the system 19 plus a positive operation of the system 20. The frequency of the pulses in either system will be not more than one such pulse to such a cycle of the timing oscillator.

With the system according to this invention, none of the timing oscillator be such that one cycle comprises when there is a coincidence of two. The two pulse train systems may represent a control function such as one being a representative of a measurement, and the other of a set point. They also may be any other two suitable pulse trains for whatever similarly suitable purpose wherein anti-coincidence is desirable.

In FIGURE III the pulse train flow is from left to right in the drawing with an input passage for pulse frequency A at 70 and an input for pulse frequency B at 71. These input trains are then passed through anti-coincidence unit 72 which is illustrated in and described hereinafter with respect to FIGURE II.

With this anti-coincidence device the arithmetic subtractor in the function of this invention is assured of the action of each and every pulse from both of the pulse trains.

Accordingly, the output of the anti-coincidence unit 72, in terms of pulse frequency A, is applied to a fluid logic flip-flop binary unit 73, through an "and" gate 74. The flip-flop unit 73 has a power supply 75, and two output passages 76 and 77 in which signals appear in accordance with the position of the flow through the flip-flop unit.

The input of pulse frequency A to control the flip-flop 73 is in terms of a passage 78 from the anti-coincidence device 72 through the "and" gate 74 to provide a control input at 79 to the flip-flop unit 73. In the operation of the flip-flop unit, when a signal is applied and thereto from the control input 79 the flip-flop output is achieved in the output passage 77. From the output passage 77 there is a feedback passage 80 which leads to the "and" gate 74 through a signal input at 81. When there is no feedback signal in the flip-flop feedback 80 and "and" gate input 81, then a signal from the input passage 78 will pass directly through the "and" gate 74 to provide a control signal at 79 to the flip-flop 73. Similarly, if there is a signal in the flip-flop feedback 80 and "and" gate input 81 at a time when there is no input pulse in the passage 78, then the feedback from the output passage 77 will go directly through the "and" gate 74 and vent as at 82.

If, however, there is simultaneously applied to the "and" gate 74, a signal from the input 78 and pulse train A, and a feedback signal at 81, then these two signals will meet and interact within the "and" gate and exit together in a common output passage 83.

In similar fashion pulse frequency B is applied to the device through input passage 71, through the anti-coincidence device 72, and by way of input passage 84, is applied to an "and" gate 85. When there is no interference with the pulse in input 84, it passes directly through the "and" gate to a control input 86 for the flip-flop unit 73, in opposition to the control input 79 from the pulse frequency A system.

Whe a pulse is effective in the flip-flop 73 from the control input 86, this output is in a flip-flop output passage 76, and it in turn has a feedback passage 87, leading to a control input 88 in the "and" gate 85. In the absence of a pulse in the input passage 84 a signal from the "and" gate input 88 will pass directly through to vent as at 89. In the event of simultaneous appearance with a signal in the input 84 and the feedback 88 they will meet and interact in the "and" gate 85 and exit together through a common output 90 as a single signal.

In the operation of the device of FIGURE III, if for example, in the pulse train A, there are two consecutive pulses without interference from a pulse in the pulse train B, the first of these two pulses will pass directly through the "and" gate 74, assuming the existence of a reset situation wherein the flip-flop unit 73 starts with an output from passage 76.

This first input signal will enter the flip-flop 73 through the control input passage 79, to cause the flip-flop to change its output from passage 76 to passage 77. This output provides a feedback through the passage 80 and through the "and" gate 74 by way of "and" gate input 81 and out through the vent 82.

Accordingly, the first of two consecutive pulses has established the flip-flop unit 73 in the particular position, and has provided the feedback to the "and" gate in a preparatory action prior to the arrival of the second consecutive pulse.

When the second consecutive pulse arrives at the "and" gate 74, it interacts with the feedback signal which is already there, and passes out through the common output 83 as the output signal.

The first of two such consecutive signals will establish the siutation, and the second will be exited as a signal in passage 83. The system therein involving the pulse frequency B operates in the same fashion only in the opposite sense with respect to the flip-flop 73.

Through the inputs 71 and 84, a first pulse will pass through the "and" gate 85 and will establish the flip-flop with an output 76 and the feedback through passage 87 to the "and" gate input 88. This feedback will, at this point in time vent as at 89. However, when the next consecutive pulse, without interruption from the other train, comes along in the frequency B, it will meet the feedback from the input 88, interact within the "and" gate 85 and exit through the passage 73 as a single pulse signal.

Accordingly, if there are two such pulses in frequency A, an output pulse of "one" appears in the output 83. If after these two consecutive pulses, a pulse appears in the other frequency system B, it will change the state of the flip-flop 73 and, as between these two signals, frequency A with two pulses, frequency B with one pulse, the subtraction answer would be "one," and this "one" appears in the output 83 as pulse frequency A minus B.

In like fashion where the pulse frequency B is greater than that of pulse frequency A the output will appear in the lower of the two systems through output passage 90 in terms of pulse frequency B minus A. An automatic shift-over will occur so that the smaller will always be subtracted from the larger regardless of which system contains the greater frequency.

It may be noted that in the output of the flip-flop 73 both outputs 76 and 77 individually have the same output signal and it is in terms of the lower of the two frequencies.

This invention therefore provides a new and useful fluid logic pulse frequency rate system based on the concept of delaying part of the pulse train and then comparing the present pulse rates with the recently preceding pulse rates.

As many embodiments may be made of the above invention, and as changes may be made in the embodiments set forth above without departing from the scope of the invention, it is to be understood that all matter hereinbefore set forth or shown in the accompanying drawings is to be interpreted as illustrative only and not in a limiting sense.

I claim:

A fluid logic pulse frequency rate measuring reversible device comprising a first pulse train path for receiving all of the pulses of a train of fluid pulses, a branch path from said first path and continuously operatively open thereto, for also receiving all of the pulses of said pulse train, with pulses equal in number and coincident in time with the pulses in said first path prior to said branch, on an unchanging basis of introduction of all said pulses to both said paths, delay means in said branch path for delaying all the pulses received in said branch path, a pulse anti-coincidence device operatively encompassing both said paths downstream of said delay means, whereby said first pulse train path prior to said anti-coincidence device leads directly to and only to said anti-coincidence device and said branch path prior to said delay leads directly to and only to said delay and thereafter directly to and only to said anti-coincidence device, the output of said anti-coincidence device being effectively a continuance of said first path and, separately, a continuance of said branch path, with no pulse in said first path output coincident in time with a pulse in said branch path output, a reversible, pulse frequency subtractor unit operatively encompassing both said paths downstream of said anti-coincidence device, with means for comparing the frequency of the pulses in said first path with the frequency of the pulses in said branch path by subtracting the lesser from the greater to indicate rate of increase and decrease of pulses in the pulse frequency train in said first path, output means from said subtractor device for signals indicating such rate of increase, and output means from said subtractor device for signals indicating such rate of decrease, whereby a present frequency is compared with a delayed frequency of initially the same pulse train.

References Cited by the Examiner

UNITED STATES PATENTS

| | | | |
|---|---|---|---|
| 3,081,942 | 3/1963 | Maclay | 235—201 |
| 3,124,160 | 3/1964 | Zilberfarb | 235—201 |
| 3,190,554 | 6/1965 | Gehring et al. | 235—201 |

OTHER REFERENCES

Gray et al.: "Fluid Amplifiers," Control Engineering, February 1964, pp. 57–64.

Grubb, "Fluid Logic Shift Register," IBM Technical Disclosure Bulletin, vol. 6, No. 1, June 1963, p. 24.

Mitchell, "Fluid Binary Counter," IBM Technical Disclosure Bulletin, vol. 6, No. 2, July 1963, p. 30.

GERALD F. BAKER, *Acting Primary Examiner.*

LEO SMILOW, *Examiner.*

WAYNE F. BAUER, *Assistant Examiner.*